US012752472B2

(12) United States Patent
Consolaro et al.

(10) Patent No.: US 12,752,472 B2
(45) Date of Patent: Oct. 6, 2026

(54) CONTAINER MADE USING A MOULDING SYSTEM AND RELATED MANUFACTURING METHOD

(71) Applicant: BREVETTI ANGELA S.R.L., Arzignano (IT)

(72) Inventors: Roberto Consolaro, Arzignano (IT); Angelo Consolaro, Arzignano (IT); Rajeev Kabbur, Arzignano (IT)

(73) Assignee: Brevetti Angela S.R.L., Arzignano (IT)

( * ) Notice: Subject to any disclaimer, the term of this patent is extended or adjusted under 35 U.S.C. 154(b) by 216 days.

(21) Appl. No.: 18/280,194

(22) PCT Filed: Feb. 25, 2022

(86) PCT No.: PCT/IT2022/050033

§ 371 (c)(1),
(2) Date: Sep. 1, 2023

(87) PCT Pub. No.: WO2022/185350

PCT Pub. Date: Sep. 9, 2022

(65) Prior Publication Data

US 2024/0140640 A1 May 2, 2024

(30) Foreign Application Priority Data

Mar. 2, 2021 (IT) ........................ 102021000004871

(51) Int. Cl.
*B29C 49/42* (2006.01)
*B65D 1/02* (2006.01)
(Continued)

(52) U.S. Cl.
CPC .. *B29C 49/42809* (2022.05); *B29C 49/42808* (2022.05); *B65D 1/0238* (2013.01);
(Continued)

(58) Field of Classification Search
CPC .................... B29C 49/42808; B29C 49/42809
(Continued)

(56) References Cited

U.S. PATENT DOCUMENTS 2,541,249 A * 2/1951 Hobson .................. B29C 49/50 264/526
3,394,209 A * 7/1968 Cheney ............... B29C 48/0017 264/533

(Continued)

FOREIGN PATENT DOCUMENTS

GB 2322078 A 8/1998
KR 102180246 B1 11/2020

OTHER PUBLICATIONS

International Search Report and Written Opinion of the International Searching Authority for International Application No. PCT/IT2022/050033, dated Jun. 13, 2022, 11 pages.

*Primary Examiner* — Timothy Kennedy
(74) *Attorney, Agent, or Firm* — Knobbe, Martens, Olson & Bear, LLP

(57) ABSTRACT

The present invention relates to a container (10) moulded from a tubular element. In particular, the container (10) in object is able to contain and dispense at least one solid or fluid substance through at least one hollow containment body (11). Advantageously, the hollow body (11) comprises a first end (111), at an opening side of the containment body (11), and a second end (112) such as to act as the bottom of the hollow body (11). Furthermore, the present invention relates to a moulding system for moulding the aforementioned container and to a method for its manufacturing.

5 Claims, 5 Drawing Sheets

(51) Int. Cl.
*B65D 1/04* (2006.01)
*B29C 49/46* (2006.01)
*B65D 23/14* (2006.01)

(52) U.S. Cl.
CPC ........ *B65D 1/04* (2013.01); *B29C 2049/4664* (2013.01); *B65D 23/14* (2013.01)

(58) Field of Classification Search
USPC .................................................. 425/524, 538
See application file for complete search history.

(56) References Cited

U.S. PATENT DOCUMENTS

| | | | | |
|---|---|---|---|---|
| 4,221,760 | A * | 9/1980 | Mnilk | B29C 49/34 264/525 |
| 8,047,394 | B2 | 11/2011 | Hansen | |
| 2006/0144853 | A1 | 7/2006 | Hansen | |
| 2008/0128959 | A1 * | 6/2008 | Kunz | B29C 49/70 425/525 |
| 2009/0250848 | A1 * | 10/2009 | Gupta | B29C 49/4817 425/234 |
| 2015/0308050 | A1 * | 10/2015 | Corbett | B65D 1/0207 162/218 |
| 2017/0247128 | A1 | 8/2017 | Klocke et al. | |

* cited by examiner

CONTAINER MADE USING A MOULDING SYSTEM AND RELATED MANUFACTURING METHOD

The present invention relates to a container made using a system for moulding containers and a related manufacturing method.

Currently, various apparatuses and techniques are known for the manufacturing of vessels, containers or vials; an example is the blowing technique called Blow moulding, or the moulding technique called "Blow Fill Seal" (BFS).

The aforementioned BFS moulding technique consists of different consecutive steps, in detail: the step of moulding the container, called "Blow", the step of filling it, called "Fill", and the step of its hermetic closure by sealing, called "Seal". According to this technique, the container body is first moulded, then loaded/filled with the desired liquid or solid content, and subsequently sealed.

In particular, to date, there are substantially two moulding methods which are based on the BFS moulding technique and which are used to manufacture the aforementioned containers.

With reference to FIG. 1, the first method consists in using the lower part of a forming mould, for the creation of the containment bodies 1 and the bottoms 2 of the container wherein, after the step of filling it, the mould is closed at the related upper head 3, thus making the openings 4 of the container.

With reference to FIG. 2, the second method consists in using the lower part of the forming mould to create the containment bodies 1 of the container and the related opening parts 4; after the filling step, the mould is closed at the upper head 3, sealing the container at the related bottoms 2.

In particular, the container is intended as a matrix of containment bodies 1 adjacent to each other and detachable.

A problem of the aforementioned moulding/forming technique is that the shape of the containers is constrained by the volume of substance they must contain inside and, therefore, by the number of shapes of containers that can be made over a useful width of the forming mould.

In fact, nowadays, in order to optimise the number of container shapes that can be made in the moulding space, they are made with a very small interaxis from each other.

What has just been said has intrinsic limitations since, just because often there is not the necessary space to make sufficiently large dispensing spouts, the vials that are thus moulded do not allow, for example, the dispensing of large drops, or the use of connectors larger than a needle.

Therefore, the higher the number of containers that are to be made along the width of the forming mould, the narrower the interaxis between the vials and, consequently, the smaller the space available to make, for example, any labels 5, engravings, identifications, coupling points thereof, insertion of connectors etc., as visible in FIG. 2.

Furthermore, on the containers thus made, it is not possible to create an opening area between the vials that is larger than their interaxis.

Within the scope of the aforementioned requirements, therefore, the main aim of the invention is to propose a container made using a system for moulding containers and a related manufacturing method, which overcomes the drawbacks of the known technique.

In particular, the aim of the invention is to manufacture a container which comprises, for example, an opening which is larger compared to the prior art and which, at the same time, is moulded in such a way as to optimise the use of the available space, to manufacture a maximum number of container shapes.

A further advantage of the present invention is to show a system for moulding containers such as to allow the manufacturing of a container which is easier to open and to empty compared to known containers having the same moulding interaxis.

Still another aim of the present invention is to realise a system for moulding containers such as to allow the creation of containers having volumes that can vary according to the request.

Last but not least, the aim of the present invention is to realise a system for moulding containers which provides and allows the making of labels, engravings, identifications and coupling points for the container itself.

These and other aims which will become clearer in the following are achieved by a container made using a system for moulding containers and a related manufacturing method, as it will become clearer in the following of the present specification.

The object of the invention is a container moulded, advantageously, from a tubular element, for example, made of plastic material, able to contain and dispense at least one solid or fluid substance.

In detail, the container object of the present invention has a longitudinal axis and comprises at least two hollow containment bodies wherein the first hollow containment body is oriented according to a first orientation direction, with respect to the aforementioned longitudinal axis. The second containment body is moulded so as to be adjacent to the first containment body, and is oriented according to a second orientation direction, opposite to the aforementioned first orientation direction of the first containment body.

Advantageously, the container object of the present invention can comprise a central or median zone of variable volume and capable of increasing the capacity of each one of the containment bodies.

Furthermore, the containment bodies comprise respective first ends, opposite to each other and corresponding to their respective opening sides, and respective second ends, opposite to the aforementioned first ends, such as to advantageously act as the bottom of the containment bodies.

Still advantageously, at the first or second ends, there may be panels that are integrally moulded therewith, preferably for the application of labels or engravings.

Furthermore, the aforementioned panels can have a substantially polygonal and flat shape and are moulded in correspondence with an empty portion between the second ends of the hollow bodies on which they are moulded, and a further empty portion at the first ends of the adjacent hollow body, in such a way to optimise the use of the moulding space.

Advantageously, each of the aforementioned containment bodies can comprise, integrally moulded therewith and at the first ends, a hollow coupling means such as to act, both as an accessory for the coupling and as a twist off tab for the opening of the containment bodies.

In addition, the containment bodies have a substantially longitudinal shape and can comprise at least a tapered portion.

Still advantageously, the aforementioned container can be moulded using the BFS or blowing technique called Blow moulding, using a system for moulding containers and a mould included therein.

In particular, the container object of the present invention, moulded using the aforementioned moulding system, can be made using a manufacturing method comprising the following steps:

- extrusion of the tubular element at the melting temperature of the material the tubular element is made of;
- insertion of the tubular element into the aforementioned mould of the moulding system;
- closing of a first end of the tubular element, to mould the container in object, so that each containment body has an orientation direction opposite to the orientation direction of the adjacent containment body; and that therefore they are in an inverted position with each other;
- moulding of the container by blowing.

In detail, the method described so far allows, advantageously, to manufacture containers that are empty inside and closed only at one end.

Furthermore, still advantageously, the method described herein can comprise a further step of closing the second end of the container, opposite to the first end of the tubular element, so that each containment body is in an inverted position with respect to the adjacent containment body.

Finally, before this last aforementioned step of closing the second end of the container, a further step of filling the container and then each hollow containment body of the aforementioned substance could be provided.

Further characteristics and advantages of the invention will become more evident from the description of a preferred, but not exclusive, embodiment of the container made using a moulding system and a related manufacturing method, according to the invention, illustrated by way of non-limiting example, with the aid of the attached sheets of drawings, wherein.

With reference to the aforementioned figures, generally, the container, object of the present invention, is indicated with the reference number 10. In particular, the container 10 is a matrix of containing bodies 11 adjacent to each other and individually detachable.

Figure 1:
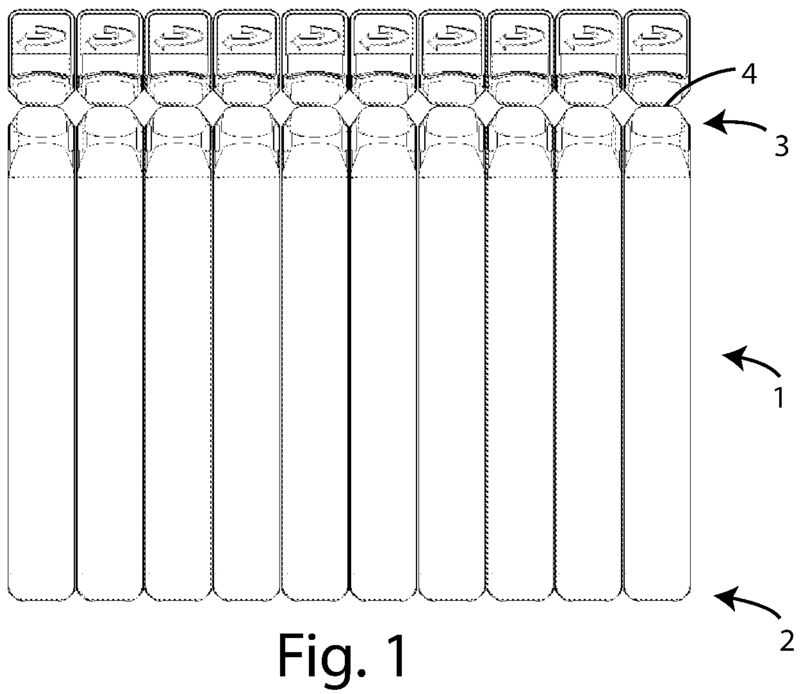
FIG. 1 shows a front view of a first embodiment of the prior art.
Figure 2:
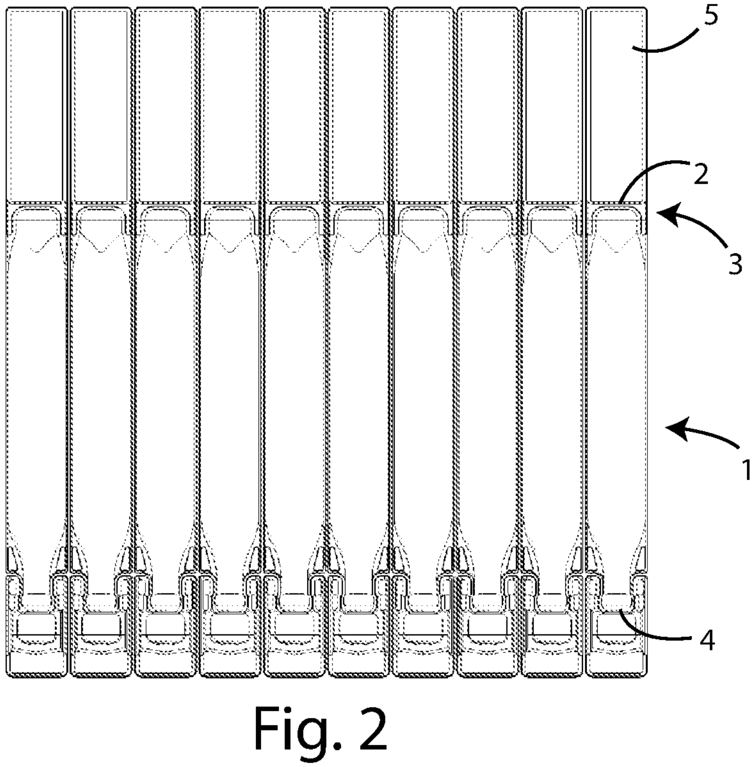
FIG. 2 shows a front view of a second embodiment of the prior art.
Figure 3A:
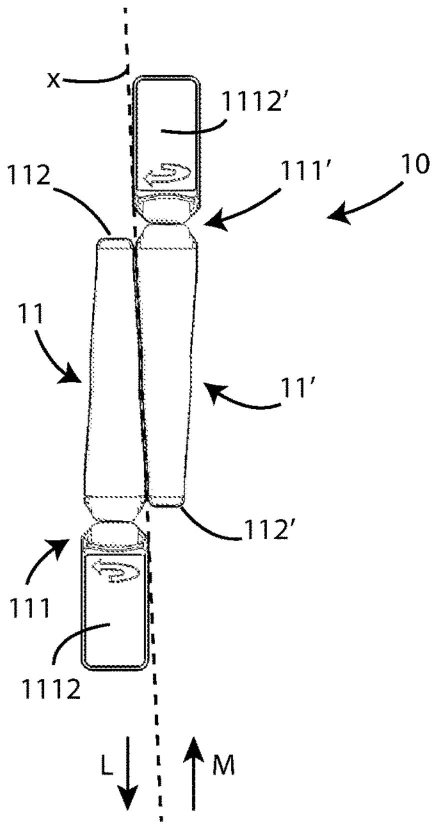
FIG. 3A shows a front view of a first embodiment of the container, object of the present invention, in a row of two.
Figure 3B:
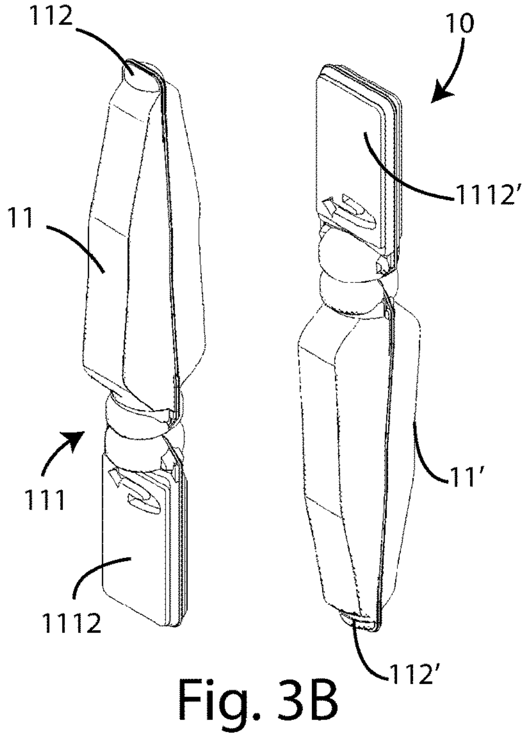
FIG. 3B shows a perspective view of the single containment bodies that make up the container of FIG. 3A, according to the present invention.
Figure 4A:
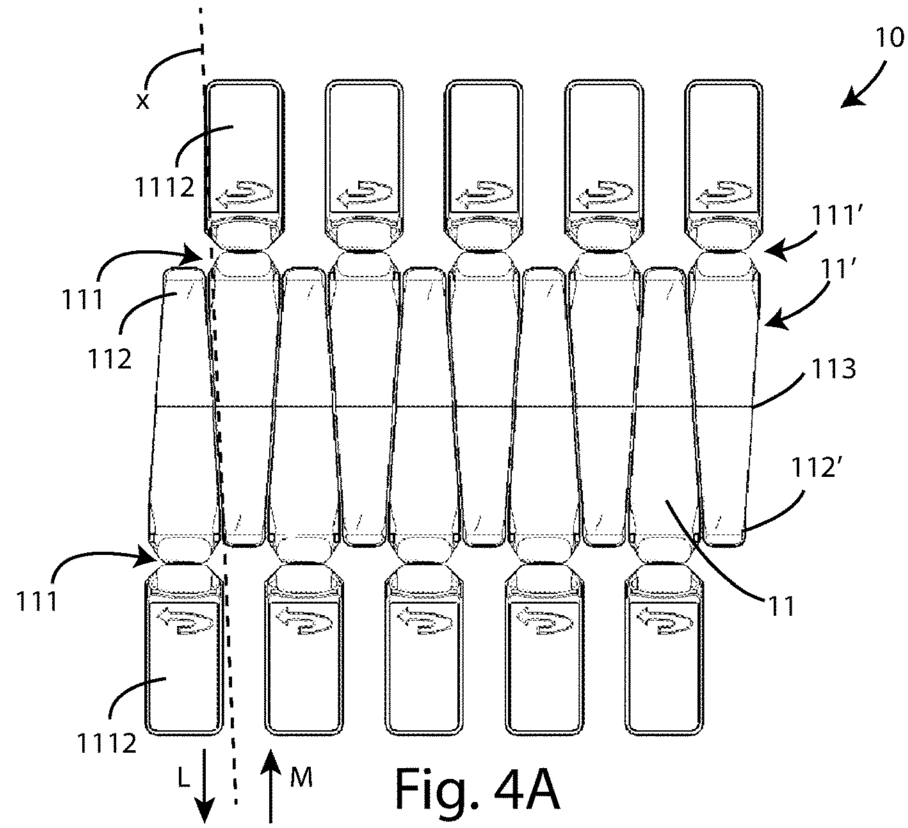
FIG. 4A shows a front view of a variant embodiment of the container, object of the present invention.
Figure 6A:
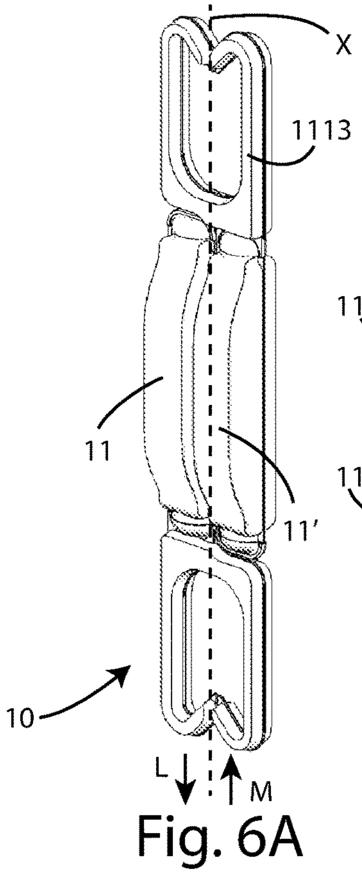
FIG. 6A shows in a perspective view a third embodiment of the container, object of the present invention.

As visible in FIGS. 3A, 4A and 6A, the container 10, object of the present invention, advantageously has a longitudinal axis X, perpendicular thereto.

Advantageously, the moulding system, object of the present invention, comprises all the devices for manufacturing containers using the blow moulding or the BFS method and, in particular, a mould suitable for making the containers 10, from a tubular element, having at least one hollow containment body 11 such as, by way of example only, a dispensing vial.

In particular, each containment body 11 is able to contain at least one solid or fluid substance such as, for example, a product of a medical type.

Advantageously, each hollow containment body 11 can have a substantially longitudinal and tapered shape, for example, conical, and is made of tubular elements in materials for example of plastic type, such as to be subject to BFS or Blow moulding processes.

In detail, the moulding system makes it possible to manufacture a hollow body 11 having a first orientation direction L with respect to the longitudinal axis X of the container 10 (FIGS. 3A, 4A and 6A). By "orientation direction" or simply "orientation" of the hollow containment body 11, herein we mean the direction towards which the opening of the hollow body 11 itself faces for dispensing.

Advantageously, the containment body 11 comprising a first end 111, at the opening side of the containment body 11, and from which the substance contained therein will be dispensed, and a second end 112 at the base of the containment body 11 in object, opposite to the aforementioned first end 111, in such a way as to act as the bottom of the containment body 11.

Furthermore, in a first embodiment of the container 10 and therefore of the mould 51 making part of the moulding system, each hollow body 11 advantageously has, at the first end 111, a tab 1112 of the twist-off type which can be detached to allow its opening and the dispensing of what is contained therein, by rotating it. Advantageously, the removal through rotation of each tab 1112 from the related containment body 11 takes place individually for each hollow body 11 and therefore independently from the remaining hollow bodies 11 or 11' which constitute the container 10, facilitating the use of the containment body 11 in object.

Figure 3C:
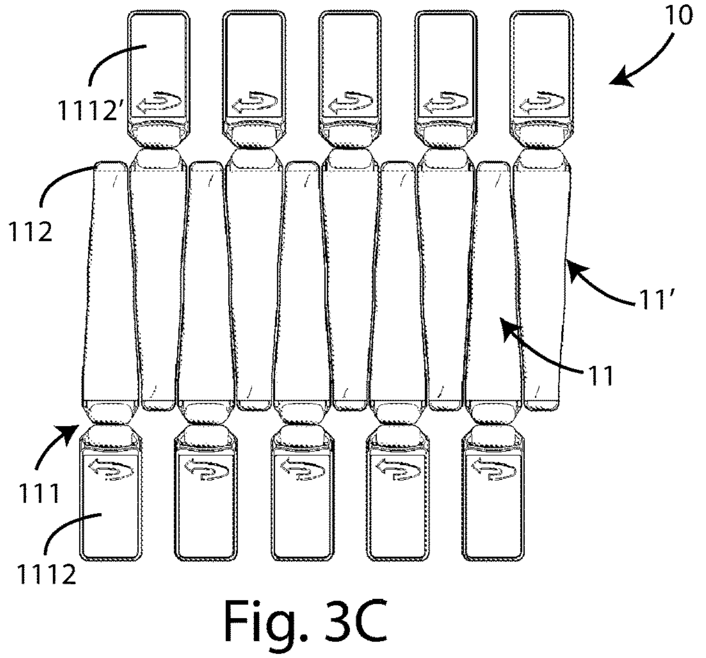
FIG. 3C shows a front view of the container of FIG. 3A, in a row comprising a plurality of containers, according to the present invention.

In particular, as visible in FIGS. 3A and 3C, the moulding system is such as to allow, starting from each containment body 11, the moulding of the containment body 11' adjacent thereto, having a second orientation direction M (FIGS. 3A, 4A and 6A) opposite to the first orientation direction L for the manufacturing of the container 10.

Advantageously, this characteristic allows to have, with the same interaxis between each hollow body 11 and 11', a greater space between two openings having the same orientation compared to that obtainable according to the methods used in the prior art, optimizing the use of the useful moulding spaces.

Furthermore, the configuration with the vials tapered towards the bottom allows to also have larger openings, which allow to obtain all the advantages this brings, for example to dispense larger drops of the contained substance, this being also valid for more viscous substances, or to access with larger connectors.

Figure 7:
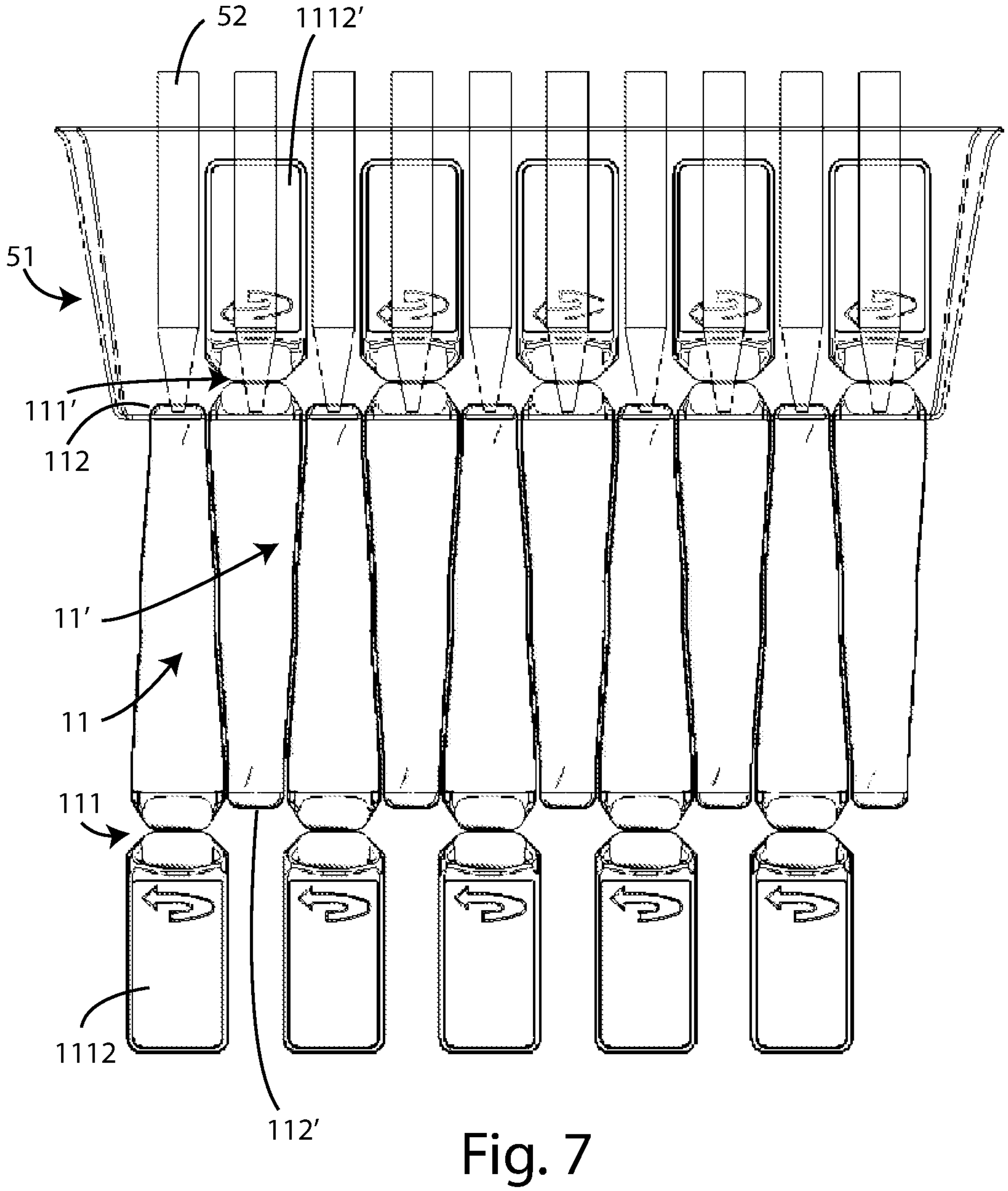
FIG. 7 shows a front view of the container of FIG. 3C, wherein the filling step thereof is outlined, according to the variant of the invention which provides for the BFS technique.

Advantageously, in the embodiment in question, and as visible in FIG. 7, the mould 51 making part of the moulding system is such as to mould each containment body 11 in an overturned manner with respect to the adjacent containment body 11'; consequently, the first and second ends 111 and

111', 112 and 112' respectively of each containment body 11 are inverted with each other, advantageously optimising the use of the useful moulding space available and effectively increasing the interaxis between openings facing the same direction.

More in detail, as visible in FIG. 7, in order to achieve the advantages just described, the mould 51 of the moulding system in object will form, by way of example, a first containment body 11 with the opening 111 facing towards a first direction and a second containment body 11' adjacent to the first containment body 11, with the opening 111' facing towards a second direction, opposite to the first direction.

Figure 4B:
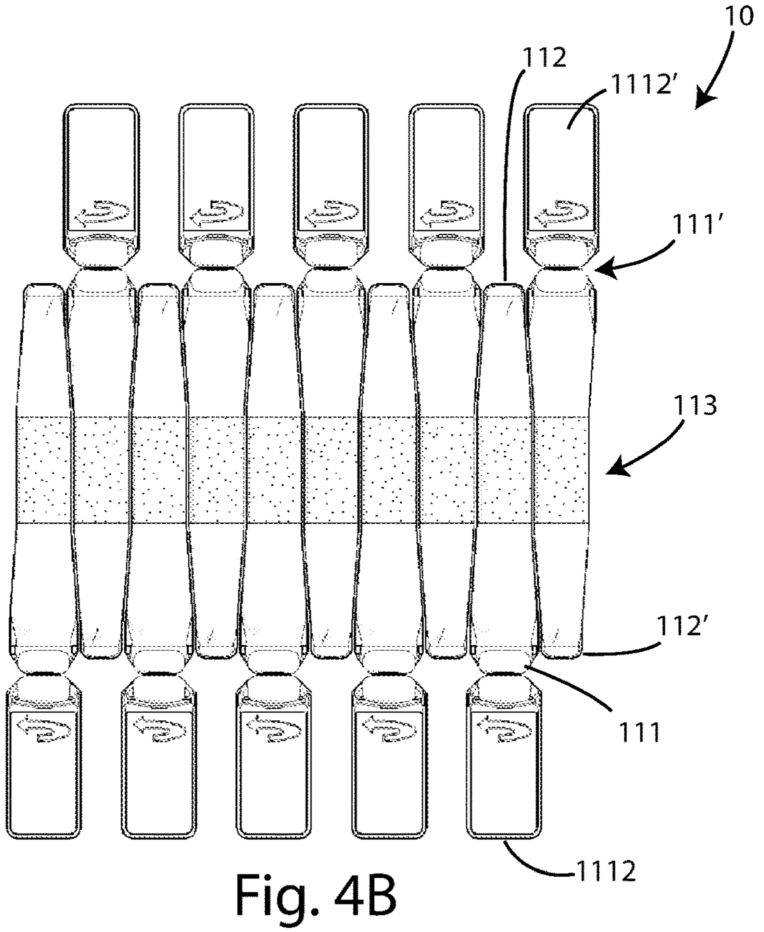
FIG. 4B shows a front view of the container of FIG. 4A, wherein the shape of the container has a variation in volume in correspondence with the respective median zone.

Still advantageously, in a variant embodiment of the container 10 and of the mould belonging to the moulding system, applicable to the embodiments described in the present patent application, but also to the other known configurations, as visible in FIGS. 4A and 4B, the mould, through a median portion of variable length, is such as to allow a variation in the volume of the container 10 in its entirety, depending on the request, by lengthening the central or median area 113 (FIG. 4B) and consequently increasing the capacity of each individual containment body 11, while not exceeding the given useful moulding space of the moulding system.

Figure 5:
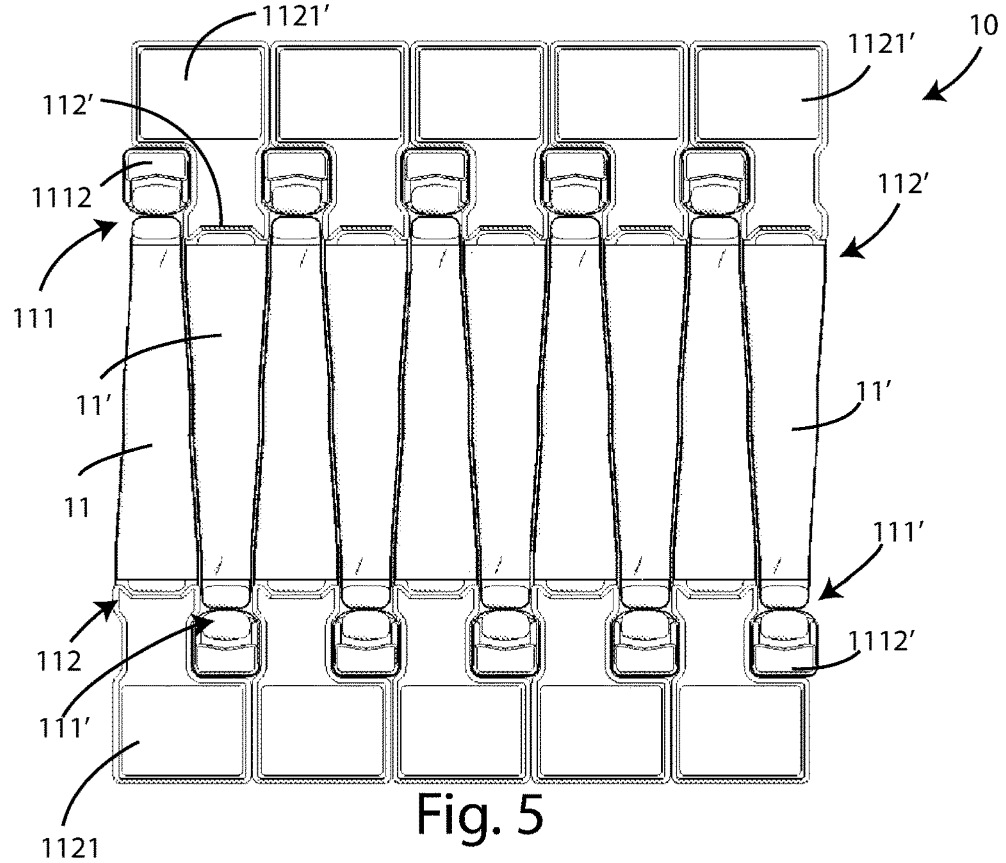
FIG. 5 shows a front view of a second embodiment of the container according to the present invention.

Furthermore, in a second shape of the container 10 and therefore of the mould belonging to the moulding system, as visible in FIG. 5, the containing bodies 11 and 11', in addition to including what is described in the previous embodiments, comprise, at the respective second ends 112 and 112', a panel 1121 and 1121' integrally moulded therewith.

Advantageously, the aforementioned panels 1121 and 1121' have a substantially polygonal and flat shape such as to be placed and fit perfectly into the otherwise empty spaces of the mould, for example, in correspondence of the area between the second ends 112 and 112' of the hollow bodies 11 and 11', on which they are directly moulded, and the area corresponding to the first ends 111' and 111 of the hollow bodies 11' and 11 adjacent thereto, in such a way as to optimise the use of the useful moulding space, for example, for the application of labels, engravings, etc.

Figure 6B:
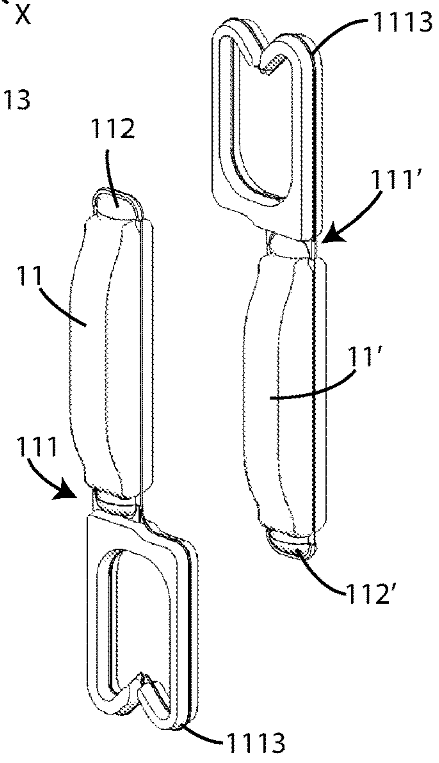
FIG. 6B shows a perspective view of two containers of FIG. 6A, detached from each other.

Furthermore, as visible in FIG. 6, in a third embodiment of the container 10, the containment bodies 11 and 11' comprise, at their first ends 111 and 111', and integrally moulded therewith, hollow coupling means 1113 such as to act both as an accessory for coupling the container 10, for each containment body 11 or 11', and as a twist off tab, for opening the respective containment body 11.

Furthermore, referring to FIG. 7, according to the invention, the method for manufacturing the container 10, for example, when it is carried out using the Blow moulding system, includes the following steps:

extrusion of the tubular element, for example in plastic material, at the melting temperature of the plastic material used;

insertion of the tubular element into the mould of the moulding system, said mould comprises two moulding halves;

closing of a first end of the tubular element, to mould the container 10, so that each one of the first containment bodies 11 is in an inverted position with respect to each one of the second adjacent containment bodies 11', i.e. the first containment bodies 11 and the second containment bodies 11' have the first end 111 and the second end 112', respectively, closed;

moulding of the container 10.

In detail, by using the moulding method just described, containers will then be made closed only at one end and empty inside.

Furthermore, it is possible to manufacture an empty container, closed also at its second end using an additional step of:

closing the second end of the container 10, opposite to the first end of the tubular element, so as to seal the first containment bodies 11 and the second containment bodies 11' at the respective second ends 112 and first ends 111'.

Finally, advantageously, similarly to what has just been described, it is possible to carry out the manufacturing method of the container 10, using a BFS or blow moulding process that has all the steps previously analysed with the addition of a further step of:

filling of the container 10, and therefore of the individual hollow containment bodies 11 and 11', with the substance of interest.

In detail, when this step takes place in the context of the BFS method, the filling takes place at the respective second end 112 and the first end 111', by means of nozzles 52, through the still open portion 51 of the mould (FIG. 7), in particular before the step of closing the second end of the container 10.

All the details may be replaced by other technically equivalent elements. In practice, the materials used, as well as the contingent shapes and dimensions, may be varied according to the contingent requirements and the state of the art.

Where the construction features and the techniques mentioned in the following claims are followed by reference marks or numbers, such reference marks or numbers have been affixed with the sole purpose of increasing the intelligibility of the claims themselves and, consequently, they do not constitute in any way a limitation to the interpretation of each element identified, purely by way of example, by such reference marks or numbers.

The invention claimed is:

1. A method for manufacturing a container using a moulding system for containers, the moulding system comprising a mould for moulding the container using a blow fill seal (BFS) or a blow moulding technique, the method comprising:

extruding a tubular element at a melting temperature of a material, wherein the tubular element comprises the material;

inserting the tubular element into the mould of the moulding system;

closing a first end of the tubular element to mould the container, wherein the container has a longitudinal axis (X) and comprises at least a first hollow containment body and a second hollow containment body, wherein the first hollow containment body and second hollow containment body are moulded adjacent to each other, so that the first hollow containment body has a first orientation direction (L) and the second hollow containment body has a second orientation direction (M) opposite to the first orientation direction (L), and wherein the first hollow containment body and the second hollow containment body are arranged adjacently in a row substantially perpendicular to the longitudinal axis (X) of the container; and moulding the container.

2. The method for manufacturing a container according to claim 1, further comprising:

closing a second end of the tubular element opposite to the first end of the tubular element, so that the first hollow containment body is closed at an opening thereof and the second hollow containment body is closed at a bottom thereof.

3. The method for manufacturing a container according to claim 2, further comprising:

filling of the container.

4. The method for manufacturing a container according to claim 3, wherein filling the container takes place before closing the second end of the tubular element.

5. The method for manufacturing a container according to claim 1, wherein three or more hollow containment bodies, including the first hollow containment body and the second hollow containment body, are arranged adjacently in the row.

* * * * *